C. C. BROOKS.
RESILIENT WHEEL.
APPLICATION FILED FEB. 16, 1922.
1,431,285. Patented Oct. 10, 1922.
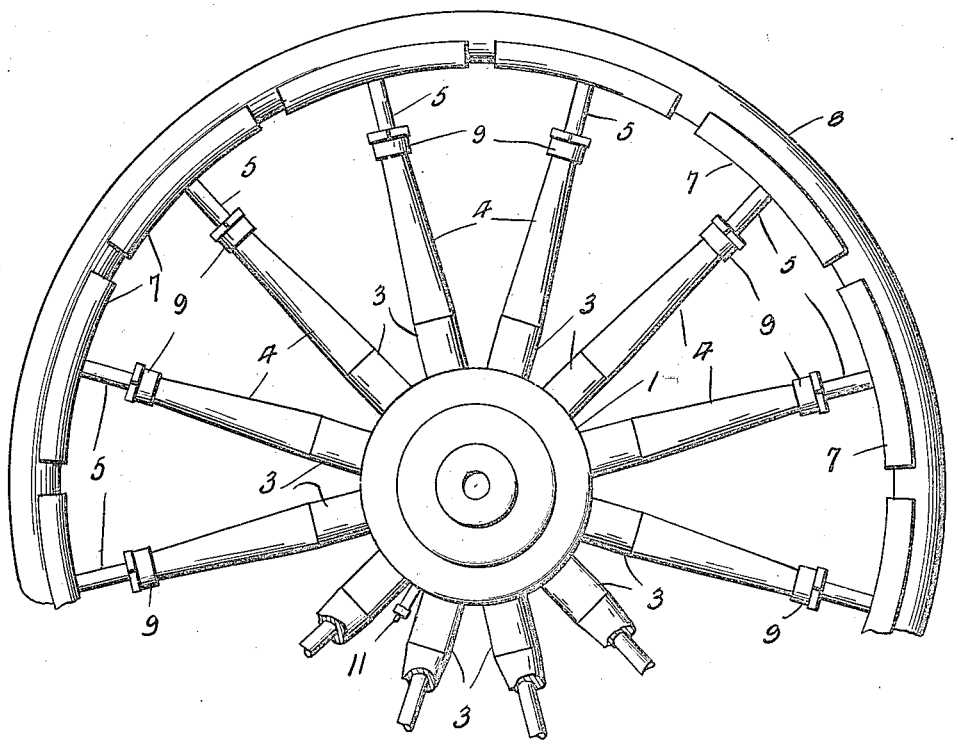
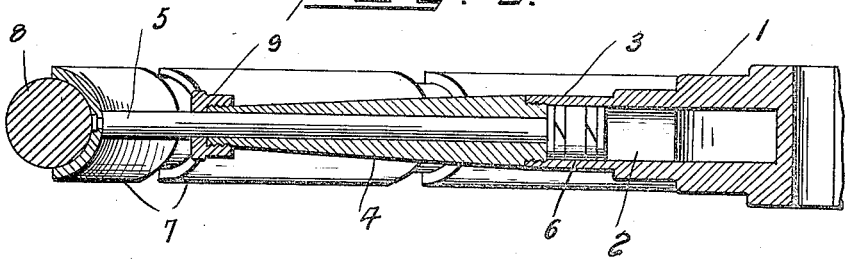
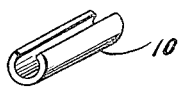
Inventor
C. C. Brooks.
By
Attorney Patented Oct. 10, 1922.

1,431,285

UNITED STATES PATENT OFFICE.

CASSIUS C. BROOKS, OF ROWOOD, ARIZONA.

RESILIENT WHEEL.

Application filed February 16, 1922. Serial No. 537,013.

*To all whom it may concern:*

Be it known that I, CASSIUS C. BROOKS, a citizen of the United States, residing at Rowood, in the county of Pima and State of Arizona, have invented certain new and useful Improvements in Resilient Wheels; and I do hereby declare the following to be a full, clear, and exact description of the invention, such as will enable others skilled in the art to which it appertains to make and use the same.

This invention relates to vehicle wheels and more particularly to the type embodying a resilient tread, whereby to neutralize shock and vibration, the wheel being particularly adapted for motor vehicles and adapted to replace the ordinary pneumatic tire.

The invention has for its object the provision of a resilient wheel of the nature aforesaid involving a simple construction, a few number of parts, and which is not susceptible to derangement and in which the parts are readily accessible for replacement or repairs as occasion may require.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is an elevation of a portion of a vehicle wheel embodying the invention, parts being in section, Figure 2 is an enlarged detail section of a portion of the wheel in line with one of the spokes, and Figure 3 is a detail view of the spring clip adapted to be fitted to a disabled spoke to prevent inward movement of the felly section associated therewith.

Corresponding and like parts are referred to in the following description and designated in the several views of the drawings by like reference characters.

The wheel embodies a hollow hub, telescoping spokes and a sectional felly. The hub 1 is formed with an annular chamber or space 2 and embodies radial bosses 3 which are in communication with the annular space 2 and constitute cylinders.

Each of the spokes comprises members 4 and 5 which have a telescopic arrangement. The members 4 are tubular and are threaded at their inner ends to the respective bosses or cylinders 3. The members 5 extend through the respective members 4 and fit the same closely without binding so as to receive a free longitudinal movement. A piston 6 is provided at the inner end of each of the members 5 and operates in a boss or cylinder 3 in which it has a piston fit to prevent loss of pressure. A felly section 7 is provided at the outer end of each of the members 5 and supports a tire 8 which is preferably solid. A gland 9 is fitted to the outer end of each of the members 4 to maintain a close joint with the cooperating member 5. The inner ends of the members 4 constitute stops to limit the outward movement of the pistons 6. The tread sections 7 are of a length to insure the formation of spaces between them, whereby to insure the resilient action of the wheel in neutralizing shock and vibration.

In the event of any one of the spokes becoming disabled so as not to perform its usual function, a spring clip 10 is provided to be fitted about the outer portion of the member 5 between the outer end of the member 4 and the tread section 7, whereby to hold the latter extended to preserve the circular outline of the wheel and prevent the formation of a flat portion which would result from any one of the tread sections 7 failing to move outwardly after being depressed incident to the weight of the load coming thereon. This spring clip 10 acts as a filler or stop to hold the tread section of the disabled spoke extended. The hub 1 is provided with an air valve 11 of any approved construction, whereby air may be supplied to the chamber or space 2 under pressure so as to hold the spokes extended by pressing the pistons 6 outwardly in the bosses or cylinders 3.

What is claimed is:

1. A resilient wheel comprising a hub having an annular air chamber and radiating bosses in communication with the annular air chamber and threaded at their outer ends, tubular spoke members threaded to the outer ends of said bosses, other spoke members telescoping with the tubular spoke members and fitting the same closely and projecting beyond the ends thereof, pistons at the inner ends of the telescoping spoke members operating in the said bosses as cylinders, glands threaded to the outer ends of the tubular spoke members, and felly sections at the outer ends of the telescoping spoke members.

2. In a resilient wheel comprising telescoping spoke members, a stop member adapted to be fitted to the outer portion of a telescoping spoke member to hold the same extended when the telescoping spoke as a whole is disabled to prevent its proper functioning.

In testimony whereof I affix my signature in presence of two witnesses.

CASSIUS C. BROOKS.

Witnesses:
   WILBUR W. BAY,
   JOHN LEETH.